United States Patent
Sampath et al.

(10) Patent No.: US 8,693,331 B1
(45) Date of Patent: *Apr. 8, 2014

(54) RATE ADAPTATION IN WIRELESS SYSTEMS

(75) Inventors: Hemanth Sampath, Sunnyvale, CA (US); Ravi Narasimhan, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 401 days.

This patent is subject to a terminal disclaimer.

(21) Appl. No.: 12/983,825

(22) Filed: Jan. 3, 2011

Related U.S. Application Data

(63) Continuation of application No. 10/734,440, filed on Dec. 11, 2003, now Pat. No. 7,864,678.

(60) Provisional application No. 60/494,437, filed on Aug. 12, 2003.

(51) Int. Cl.
*G08C 15/00* (2006.01)

(52) U.S. Cl.
USPC .............. 370/232; 370/252; 370/465; 455/88

(58) Field of Classification Search
None
See application file for complete search history.

(56) References Cited

U.S. PATENT DOCUMENTS

| | | | |
|---|---|---|---|
| 4,989,201 A | 1/1991 | Glance | |
| 5,345,599 A | 9/1994 | Paulraj et al. | |
| 5,483,676 A | 1/1996 | Mahany et al. | |
| 5,912,931 A | 6/1999 | Matumoto | |
| 6,118,565 A | 9/2000 | Frigo | |
| 6,351,499 B1 | 2/2002 | Paulraj et al. | |
| 6,377,636 B1 | 4/2002 | Paulraj et al. | |
| 6,452,981 B1 | 9/2002 | Raleigh et al. | |
| 6,499,008 B2 | 12/2002 | Miet | |
| 6,618,591 B1 | 9/2003 | Kalliokulju et al. | |
| 6,633,616 B2 | 10/2003 | Crawford | |
| 6,643,496 B1 * | 11/2003 | Shimoyama et al. | ........... 455/69 |
| 6,675,012 B2 | 1/2004 | Gray | |
| 6,687,492 B1 | 2/2004 | Sugar et al. | |
| 6,775,548 B1 | 8/2004 | Rong et al. | |
| 6,801,501 B1 | 10/2004 | Knightly et al. | |
| 6,801,580 B2 | 10/2004 | Kadous | |
| 6,826,528 B1 | 11/2004 | Wu et al. | |
| 6,889,050 B1 * | 5/2005 | Willars et al. | .............. 455/452.2 |
| 6,987,819 B2 | 1/2006 | Thomas et al. | |

(Continued)

FOREIGN PATENT DOCUMENTS

WO    WO 03/001726    1/2003

OTHER PUBLICATIONS

Catreux, et al., "Adaptive Modulation and MIMO Coding for Broadband Wireless Data Networks", Jun. 2002, IEEE Communications Magazine, pp. 108-115.

(Continued)

*Primary Examiner* — Chi Pham
*Assistant Examiner* — Shick Hom

(57) ABSTRACT

Systems and techniques for rate adaptation in wireless communication systems are described. A described technique includes generating a transmission packet parameter associated with packets transmitted by a device at a first data rate; generating a reception packet parameter associated with packets received by the device; determining a second data rate based on the transmission packet parameter and the reception packet parameter; and transmitting future packets at the second data rate.

17 Claims, 5 Drawing Sheets

(56) References Cited

U.S. PATENT DOCUMENTS

| | | | |
|---|---|---|---|
| 7,032,157 | B2 | 4/2006 | Kim et al. |
| 7,046,963 | B2 | 5/2006 | Luo et al. |
| 7,075,913 | B1 | 7/2006 | Yavuz et al. |
| 7,164,655 | B2 | 1/2007 | Li |
| 7,302,009 | B2 | 11/2007 | Walton et al. |
| 7,408,976 | B1 | 8/2008 | Narasimhan et al. |
| 7,532,563 | B1 | 5/2009 | Shirali et al. |
| 7,590,188 | B2 | 9/2009 | Giannakis et al. |
| 7,640,373 | B2 | 12/2009 | Cudak et al. |
| 7,672,685 | B2 * | 3/2010 | Itoh ................. 455/522 |
| 7,864,661 | B2 | 1/2011 | Hosur et al. |
| 7,864,678 | B1 * | 1/2011 | Sampath et al. ........... 370/232 |
| 8,149,810 | B1 | 4/2012 | Narasimhan et al. |
| 2001/0055276 | A1 * | 12/2001 | Rogers et al. ............ 370/232 |
| 2002/0056066 | A1 | 5/2002 | Gesbert et al. |
| 2002/0141349 | A1 * | 10/2002 | Kim et al. ................ 370/252 |
| 2002/0183010 | A1 | 12/2002 | Catreux et al. |
| 2002/0196842 | A1 | 12/2002 | Onggosanusi et al. |
| 2003/0003863 | A1 | 1/2003 | Thielecke et al. |
| 2003/0065712 | A1 | 4/2003 | Cheung et al. |
| 2003/0083088 | A1 * | 5/2003 | Chang et al. .............. 455/522 |
| 2003/0086486 | A1 | 5/2003 | Graziano et al. |
| 2003/0100265 | A1 | 5/2003 | Wang et al. |
| 2003/0231655 | A1 | 12/2003 | Kelton et al. |
| 2004/0017773 | A1 | 1/2004 | Piche et al. |
| 2004/0017790 | A1 * | 1/2004 | del Prado et al. ........... 370/333 |
| 2004/0082356 | A1 | 4/2004 | Walton et al. |
| 2004/0153951 | A1 | 8/2004 | Walker et al. |
| 2004/0160922 | A1 | 8/2004 | Nanda et al. |
| 2004/0160979 | A1 | 8/2004 | Pepin et al. |
| 2004/0203456 | A1 | 10/2004 | Onggosanusi et al. |
| 2005/0027840 | A1 | 2/2005 | Theobold et al. |
| 2005/0099975 | A1 | 5/2005 | Catreux et al. |
| 2005/0143027 | A1 | 6/2005 | Hiddink et al. |
| 2005/0249157 | A1 | 11/2005 | Qian et al. |
| 2005/0254592 | A1 | 11/2005 | Naguib et al. |
| 2011/0149723 | A1 * | 6/2011 | Gong et al. ............... 370/216 |

OTHER PUBLICATIONS

Foschini, et al., "On Limits of Wireless Communications in a Fading Environment when Using Multiple Antennas", 1998, Wireless Personal Communications, pp. 311-335.

Goldsmith, et al., "Adaptive Coded Modulation for Fading Channels", May 1998, IEEE Transactions on Communications, vol. 46, No. 5, pp. 595-602.

Hayes, et al., "Part 11: Wireless LAN Medium Access Control (MAC) and Physical Layer (PHY) specifications", International Standard, ISO/IEC 8802-11, ANSI/IEEE Std. 802.11, pp. i-xvi, pp. 1-512, 1999.

Hayes, et al., "Part 11: Wireless LAN Medium Access Control (MAC) and Physical Layer (PHY) specifications: High-speed Physical Layer in the 5 GHZ Band", IEEE, Supplement to IEEE Standard for Information Technology, Std. 802.11a, pp. i-viii, pp. 1-83, 1999.

IEEE Computer Society, "Draft 802.20 Permanent Document : System Requirements for IEEE 802.20 Mobile Broadband Wireless Access Systems—Version 14", IEEE 802.20-PD—Jul. 6, 2004.

IEEE Computer Society, "IEEE Standard for Information Technology—Draft Supplement to Standard [for] Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Further Higher Data Rate Extension in the 2.4 GHz Band", IEEE P802.11g/D8.2, Apr. 2003.

IEEE Computer Society, "IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Amendment 5: Spectrum and Transmit Power Management Extensions in the 5 GHz Band in Europe", IEEE P802.11h—2003.

IEEE Computer Society, "Part 16: Air Interface for Fixed Broadband Wireless Access Systems", IEEE Std 802.16—2004.

IEEE Computer Society, "Supplement to IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications: Higher-speed Physical Layer Extension in the 2.4 GHZ Band", IEEE Std 802.11b—1999.

IEEE Computer Society, "TGn Sync Proposal Technical Specification", IEEE Std 802.11n—First Edition, May 2005.

Narasimhan et al., U.S. Appl. No. 10/620,024, filed Jul. 14, 2003.

Sampath et al., U.S. Appl. No. 10/734,440, filed Dec. 11, 2003.

Sampath, et al. U.S. Appl. No. 10/834,745, filed Apr. 28, 2004.

Shirali et al., U.S. Appl. No. 10/988,318, filed Nov. 12, 2004.

Tarokh, et al., "Space-Time Block Codes from Orthogonal Designs", Jul. 1999, IEEE Transactions on Information Theory, vol. 45, No. 5, pp. 1456-1467.

Xin, et al., "Space-Time Constellation-Rotating Codes Maximizing Diversity and Coding Gains", 2001, IEEE, pp. 455-459.

* cited by examiner

FIG. 3
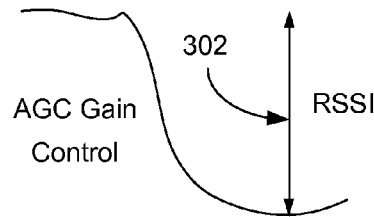
FIG. 4
| Data Rates (Mbps) | $RSSI_{TH}$ (dB) |
|---|---|
| 54 | 36 |
| 48 | 33 |
| 36 | 27 |
| 24 | 22 |
| 12 | 16 |
| 11 | 12 |
| 6 | 10 |
FIG. 5
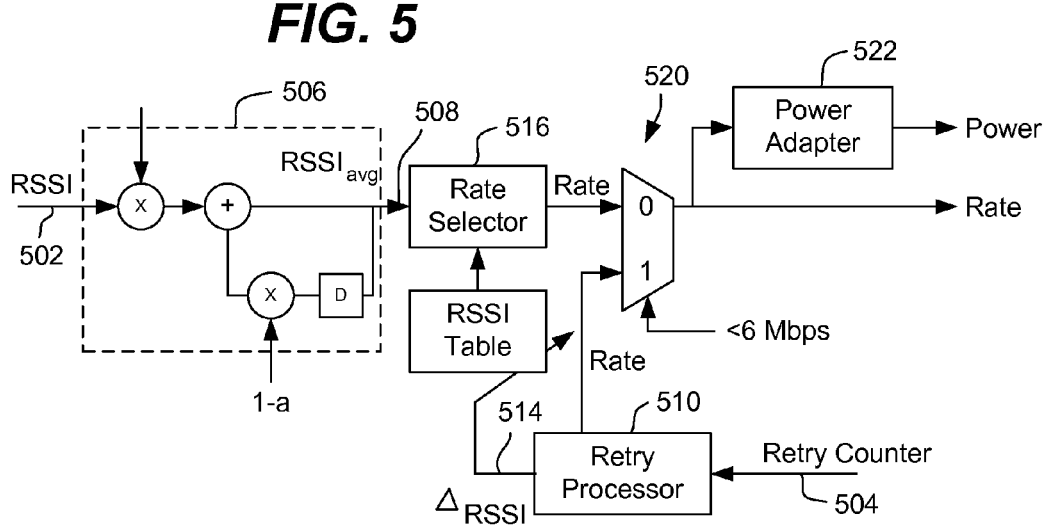

| Data Rates (Mbps) | Confidence (dB) |
|---|---|
| 54 | -10 |
| 48 | -7 |
| 36 | -1 |
| 24 | 4 |
| 12 | 10 |
| 11 | 15 |
| 6 | 20 |

R : Retry Cnt    State = # of consecutive success or failure $\Delta_{RSSI} = \Delta_{RSSI} - \Delta 1$    IF (state == MAX SUCCESS)
$\Delta_{RSSI} = \Delta_{RSSI} + \Delta 2$    IF (state == MAX FAILURE)

RATE ADAPTATION IN WIRELESS SYSTEMS

CROSS-REFERENCE TO RELATED APPLICATIONS

This disclosure is a continuation application and claims the benefit of priority under 35 U.S.C. Section 120 of U.S. application Ser. No. 10/734,440, filed on Dec. 11, 2003 (now, U.S. Pat. No. 7,864,678), which claims priority to U.S. Provisional Application Ser. No. 60/494,437, filed on Aug. 12, 2003.

BACKGROUND

The data rate at which a wireless device transmits may depend on the wireless environment in which the device is transmitting. The wireless environment may be affected by such factors as interference, packet collisions, reflections, etc. A wireless device may attempt to select an optimal data rate for a given environment using a data rate selection algorithm.

In the IEEE 802.11 family of specifications, a wireless device initiates transmission at the highest possible data rate. If the wireless device receives an acknowledgement (ACK) from a receiving device, it is assumed that the wireless environment can support the highest data rate and further transmissions occur with this (highest) date rate. Otherwise the data rate is lowered in a step-wise fashion until an ACK is obtained. Such a strategy may waste bandwidth. Furthermore, this strategy can lead to successive packet failures, which may cause TCP timeouts and associated decreases in link throughput.

SUMMARY

A transceiver may include a transmit section operative to transmit packets, a receive section operative to receive packets, and a rate selector operative to select a data rate for transmission. The rate selector may select the data rate based upon a received signal quality value determined by the receive section and a packet loss indicator value determined by the transmit section. The received signal quality value may be, e.g., an RSSI (Received Signal Strength Indicator) value, an SNR (signal to noise ratio) value, an SINR (signal to interference noise ratio) value, or a SQM (signal quality measure, which is the mean (geometric, arithmetic, or other) of the SNRs across all tones). The packet loss indicator value may be, e.g., a retry counter value, a bit-error update value, a packet error update value, a symbol error update value, or a CRC (Cyclic Redundancy Check) indicator value.

The rate selector may include a table including available data rates, each associated with a nominal received signal quality value. The rate selector may generate a confidence value for each available data rate using the received signal quality value and the packet loss indicator value. In an embodiment using RSSI for the signal quality value and a retry counter for the packet loss indicator value, the confidence value is obtained by solving the equation:

$$\text{Confidence}[j] = \text{RSSI}_{avg} - \text{RSSI}_{TH}[j] - \Delta_{RSSI},$$

where $\text{RSSI}_{TH}[j]$ comprises a nominal received signal strength value associated with a data rate [j] in a table. The rate selector then selects a data rate associated with a positive confidence value, in an embodiment, the lowest positive confidence value.

The rate selector may include a state machine that monitors the packet loss indicator value and determines whether a current data rate causes an excessive number of failed packet transmissions or an excessive number of successful packet transmissions, and updates an adjustment value for the signal quality value accordingly.

The transceiver selector may include a power adaptor that increases a transmit power of the transmit section in response to the selected data rate falling below a minimum threshold data rate and decreases the transmit power in response to the selected data rate exceeding a maximum threshold data rate.

The rate selector may include a hardware section that progressively decreases the data rate in response to the packet loss indicator value increasing until a "successful" data rate is achieved.

The rate selector may select a data rate value directly from the packet loss indicator value in response to the received signal quality value falling below a minimum signal quality value.

The transceiver may be used in a wireless LAN system that complies with one of the IEEE 802.11 family of specifications.

BRIEF DESCRIPTION OF THE DRAWINGS

FIG. 3 is a plot illustrating an RSSI (Received Signal Strength Indicator) measurement.
FIG. 4 shows a nominal RSSI table.
FIG. 5 is a block diagram of a rate adaptation module.

DETAILED DESCRIPTION

Figure 1:
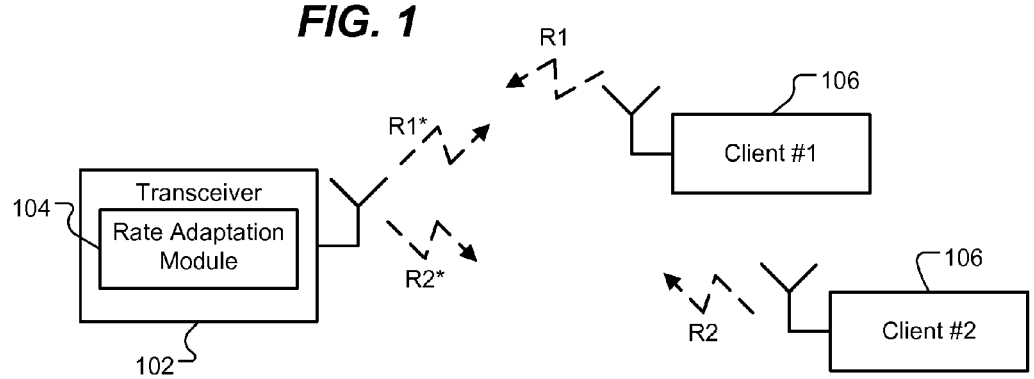
FIG. 1 is a block diagram of a wireless system.

FIG. 1 shows a wireless system. The system may be an ad hoc network of wireless devices, e.g., a wireless Local Area Network (WLAN) that complies with one of the IEEE 802.11 family of specifications. The system may include a wireless transceiver 102 with a rate adaptation module 104 and one or more wireless client transceivers 106.

The transceiver 102 may communicate with a client transceiver 106 on an uplink channel (client transmitting to transceiver) and on a downlink channel (transceiver transmitting to client). The data rates in the uplink and downlink channels depend on the characteristics of the wireless environment and may differ from each other.

In an embodiment, the transceiver 102 may use a rate adaptation scheme to optimize a data rate in communicating with the client transceivers 106. For a given data rate, throughput depends on the wireless environment, which may be affected by, e.g., interference, packet collisions, multipath fading, and implementation losses. The transceiver may select a physical (PHY) layer data rate based on the wireless channel qualities of the uplink and downlink to maximize average throughput.

Figure 2:
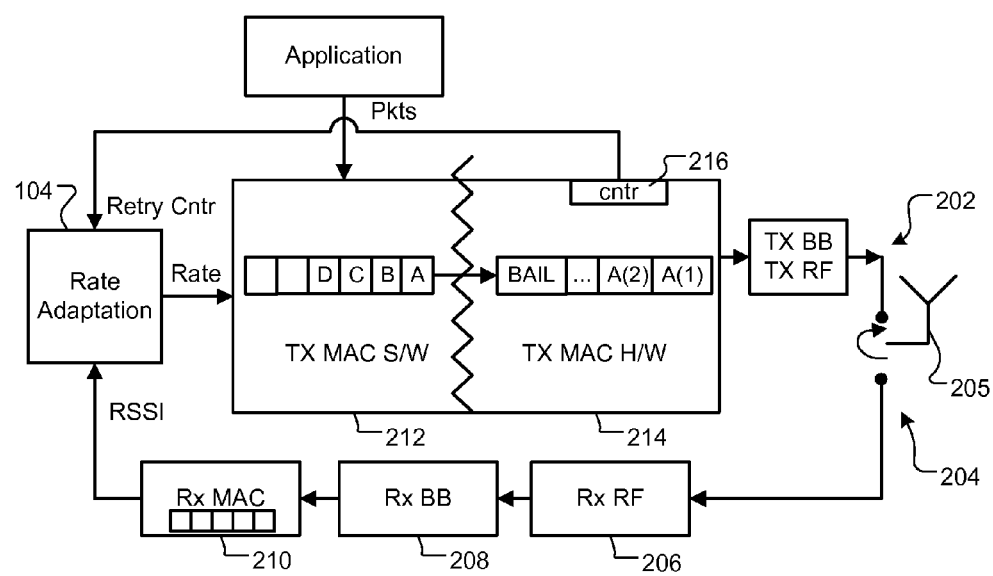
FIG. 2 is a block diagram of a transceiver with a rate adaptation module.

FIG. 2 shows a schematic of a transceiver according to an embodiment. The transceiver may have a transmit section 202 and a receive section 204. The rate adaptation module 104 may use packet loss data from the transmit section 202 and a signal quality measure from the receive section 204 to determine a suitable data rate for transmission in a given wireless environment.

In an embodiment, the signal quality measure is the RSSI (Received Signal Strength Indicator). In alternative embodiments, other signal quality measures, such as SNR (signal to noise ratio), SINR (signal to interference noise ratio), SQM (signal quality measure, which is the mean (geometric, arithmetic, or other) of the SNRs across all OFDM tones), etc., may be used.

The RSSI (or other signal quality measure) may be determined from successfully received packets, i.e., those packets received at the antenna 205 and processed by the RF (radio frequency) section 206, baseband section 208, and MAC (Media Access Control) section 210. RSSI corresponds to a drop 302 in the AGC for a successfully received packet, as shown in FIG. 3. The magnitude of the drop in AGC depends on the strength of the signal on which the packet is received. A higher RSSI indicates a "better" channel, which may support higher data rates. In an embodiment, the RSSI measurement has a measurement error corresponding to the AGC step height, e.g., +/−2 dB, and may be reliable above approximately 5 dB.

The RSSI may be used to construct a nominal RSSI table which may be adapted on a per-client basis. Depending on the complexity of implementation, multiple RSSI tables can also be maintained, which may be indexed by "packet size" (e.g., 64 bytes, 1500 bytes, etc.), "wireless environment" (e.g., home, outdoors, stadium, enterprise, etc.), etc. In other words, for different applications and environments, different tables can be used.

FIG. 4 shows an exemplary nominal RSSI table. A data rate may be selected based on a measured RSSI. For example, in this table, an RSSI of 34 (or any other value between 33 and <36) would indicate a channel quality capable of supporting a data rate of 48 Mbps.

The rate adaptation module 104 may receive a packet loss indicator from the transmit section. In an embodiment, the packet loss indicator is a retry counter value. In alternative embodiments, other packet loss indicators, such as bit-error update, packet error update, symbol error update, CRC (Cyclic Redundancy Check) indicators, etc., may be used.

Packets (e.g., A, B, C, D) may be queued in a software portion 212 of the transmit section, and copies of a packet to be sent (e.g., A(1), A(2), . . . ) may be queued in a hardware portion 214 of the transmit section. A packet may need to be resent, or "retried", until an acknowledgment (ACK) signal signifying a successful transmission of the packet is received from the receiving client. A retry counter 216 may be incremented on each retry of a packet to be sent, and the retry counter value provided to the rate adaptation module 104.

In an embodiment, the hardware section can be designed so that successive "retried" packets (e.g., A(1), A(2), . . . ) are sent at progressively lower rates until a "successful" transmission. The retry counter 216 may be incremented on each retry of a packet to be sent, and the retry counter value provided to the rate adaptation module 104. Such a feature allows successful packet transmission, while the rate adaptation algorithm can adapt to the changing environment (on a slower time scale, depending upon the retry counter). The following table provides an exemplary relationship between data rates transmitted vs. retry counter value.

| | HARDWARE PACKET RETRY TABLE | | | | | | | | |
|---|---|---|---|---|---|---|---|---|---|
| Index | Retry Count = 0 (Mbps) | Retry Count = 1 (Mbps) | Retry Count = 2 (Mbps) | Retry Count = 3 (Mbps) | Retry Count = 4 (Mbps) | Retry Count = 5 (Mbps) | Retry Count = 6 (Mbps) | Retry Count = 7 (Mbps) | Retry Count = 8 (Mbps) |
| 13 | 72 | 72 | 54 | 48 | 36 | 24 | 12 | 6 | 1 |
| 12 | 54 | 54 | 48 | 36 | 24 | 12 | 6 | 2 | 1 |
| 11 | 48 | 48 | 36 | 24 | 12 | 6 | 2 | 1 | 1 |
| 10 | 36 | 36 | 24 | 12 | 6 | 2 | 1 | 1 | 1 |
| 9 | 24 | 24 | 12 | 6 | 2 | 1 | 1 | 1 | 1 |
| 8 | 18 | 18 | 12 | 6 | 2 | 1 | 1 | 1 | 1 |
| 7 | 12 | 12 | 6 | 2 | 1 | 1 | 1 | 1 | 1 |
| 6 | 9 | 9 | 6 | 2 | 1 | 1 | 1 | 1 | 1 |
| 5 | 6 | 6 | 2 | 1 | 1 | 1 | 1 | 1 | 1 |
| 4 | 22 | 22 | 11 | 5.5 | 2 | 1 | 1 | 1 | 1 |
| 3 | 11 | 11 | 5.5 | 2 | 1 | 1 | 1 | 1 | 1 |
| 2 | 5.5 | 5.5 | 2 | 1 | 1 | 1 | 1 | 1 | 1 |
| 1 | 2 | 2 | 1 | 1 | 1 | 1 | 1 | 1 | 1 |
| 0 | 1 | 1 | 1 | 1 | 1 | 1 | 1 | 1 | 1 |

For example, let the data rate as predicted by the rate adaptation algorithm be 54 Mbps (2nd row of the table). If this packet is retried, the first transmission occurs at 54 Mbps, the next transmission occurs at 48 Mbps, the next at 36 Mbps, and so on until the packet is successfully transmitted.

The number of retries for a given packet may depend on the quality of the channel. A higher number of retries may indicate a "worse" channel, which may only support lower data rates. The transmit section may only retry the packet up to a maximum number. If the maximum retry count is achieved, the retry counter may signal a bailout ("BAIL"), in which case, the transmit section may drop the data rate for transmission to a lowest possible rate.

FIG. 5 is a schematic diagram of a rate adaptation module according to an embodiment. The rate adaptation module receives two inputs; an RSSI value 502 from the receive section, and a retry counter value 504 from the transmit section. A filter 506 may be used to determine an average RSSI value ($RSSI_{avg}$) 508 from the input RSSI 502, which may minimize noise effects and provide a more stable measurement. A retry processor 510 may use the input retry counter value to calibrate the average RSSI value, with) a $\Delta_{RSSI}$ 514 measurement The $\Delta_{RSSI}$ is an adjustment to the average RSSI value due to differences in transmit/receive vendor boards, differences in transmit and receive wireless environment, or power and/or link imbalances between transmission and reception of data packets.

A rate selector 516 may use the $RSSI_{avg}$ value 508, the $\Delta_{RSSI}$ value 514, and the $RRSI_{TH}$ values in a nominal table (such as that shown in FIG. 4) to form a confidence value. The confidence value may be given by:

$$\text{Confidence}[j]RSSI_{avg}-RSSI_{TH}[j]-\Delta_{RSSI} \quad 1\leq j\leq 54$$

Figures 6, 7:
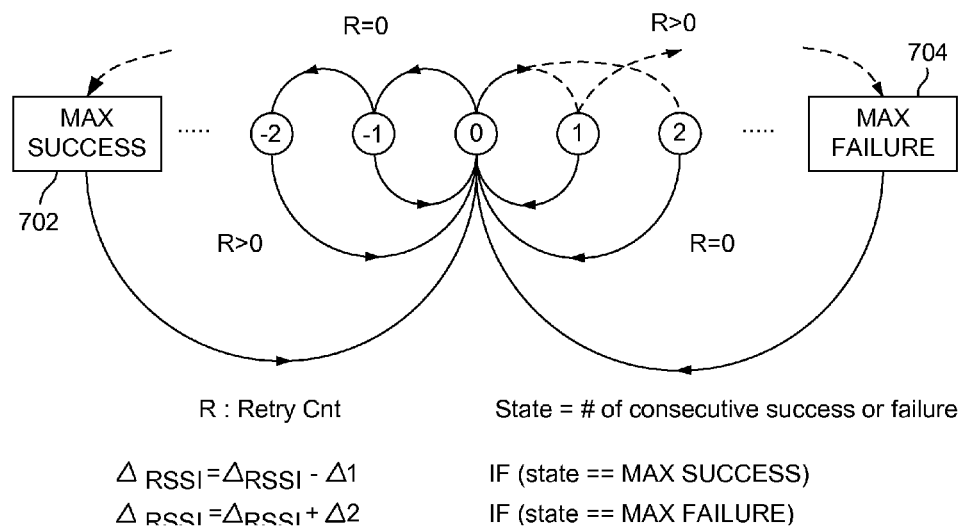
FIG. 6 shows an adjusted RSSI table.
FIG. 7 shows a state machine in a retry processor.

FIG. 6 shows an example for a measured $RSSI_{avg}$ of 24 dB and $\Delta_{RSSI}$ of -2 dB. A positive confidence value indicates a data rate that can be supported by the channel quality and a negative confidence value indicates a data rate that cannot be supported by the channel quality. An optimal data rate may be selected by selecting the highest data rate in the table with a positive confidence value, i.e., $$\text{Rate}=\arg\min(j)\{RSSI_{avg}-RSSI_{TH}[j]-\Delta_{RSSI}\}+$$

In this example, the rate selector may select a data rate of 24 Mbps, the highest data rate with a positive confidence value. This may maximize throughput while maintaining reliable link quality.

Although FIG. 6 shows an adjusted RSSI table including confidence values calculated for all data rates, in an embodiment the rate selector 516 may only calculate confidence values for data rates in the table adjacent to the data rate corresponding to the measured $RSSI_{avg}$ value, e.g., 38 Mbps and 12 Mbps in FIG. 6.

The retry processor may include a state machine, such as that shown in FIG. 7. The state machine may be used to determine whether the adjusted table is too optimistic (i.e., data rate is too high for the conditions) or too pessimistic (i.e., data rate is too low for the conditions). The state machine may track the number of successful (R=0) and unsuccessful (R>0) packet transmissions. Too many successive packet transmissions packets without retry may suggest that the adjusted table is too pessimistic, and too many successive transmissions with retry values greater than zero may suggest that the adjusted table is too optimistic. The retry processor may use this information to adjust the $\Delta_{RSSI}$ up or down. The adjustment in $\Delta_{RSSI}$ may change the confidence values in the adjusted table and possibly the data rate. However, a change in $\Delta_{RSSI}$ will not necessarily result in a change in data rate.

The retry processor 516 may start at state 0. If the retry counter returns a retry count of zero, i.e., the packet is transmitted successfully without retry, the state machine may move to from state 0 to state −1. If the next packet is not successfully sent (i.e., R>0), the state machine may return to state 0. Alternatively, if the next packet is successfully sent without retry, the machine may move from state −1 to state −2. Successive successful transmissions without retries may move the state machine to a maximum success state 702. If the state machine reaches this state, it is assumed that the table is too pessimistic and must be adjusted. In this case, $\Delta_{RSSI}$ may be adjusted to a value $\Delta_{RSSI}-\Delta_1$, where $\Delta_1$ is a pre-selected adjustment value.

From state 0, if the retry counter returns a value greater than zero (indicating a packet was resent), the state machine may move from state 0 to state 1. If packet is successfully sent in the next retry, the state machine may return to state 0. Alternatively, if the packet is retried again, the state machine may move to state 2. The state machine may move to progressively higher states as the same packet, or the next packet, is repeatedly retried. This may continue up until a maximum failure state 704. If the state machine reaches this state, it is assumed that the table is too optimistic and must be adjusted. In this case, $\Delta\Delta_{RSSI}$ may be adjusted to a value of $\Delta_{RSSI}+\Delta_2$, where $\Delta_2$ is a pre-selected adjustment value.

The state machine may be modified from that shown in FIG. 7 in alternative embodiments. For example, from state 0, if the retry counter returns a value N greater than zero (indicating a packet was resent), the state machine may move from state 0 to state N. If packet is successfully sent in the next retry, the state machine may go to state N−1. Alternatively, if the packet is retried again, the state machine may move to state N+1.

The values of $\Delta_1$ and $\Delta_2$ may be programmable in software. For example, in an embodiment, the following values were used: $\Delta_1$=0.5 dB, MAX SUCCESS=3; and $\Delta_2$=1 dB, MAX FAILURE=2.

Other measures of packet loss may be used in the state machine, such as bit-error, packet error, symbol error, CRC failures, etc.

In normal operation, the adjusted RSSI (or other signal quality measure) table may be matched to the environment. Sporadic failures may occur due to additive white Gaussian noise (AWGN), phase noise, scrambler effects, collision, or interference, but typically, the conditions will require the $\Delta_{RSSI}$ be adjusted only rarely or in both directions, thereby canceling the adjustments out. Repeated successes or failures may indicate that the RSSI table is not matched to the environment and may lead to $\Delta_{RSSI}$ updates. However, as stated above, a change in $\Delta_{RSSI}$ will not necessarily result in a change in data rate. Multiple $\Delta_{RSSI}$ updates are typically required to actually change rates. The updates may merely change the confidence factors.

Figure 8A:
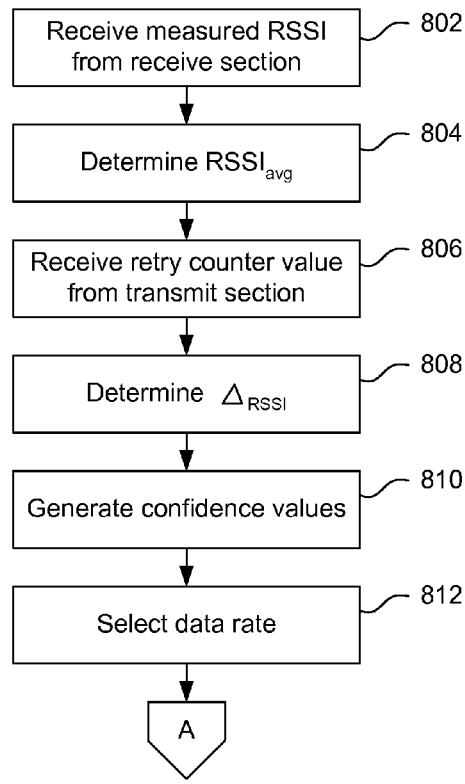
FIGS. 8A and 8B show a flowchart describing a rate adaptation algorithm.
Figure 8B:
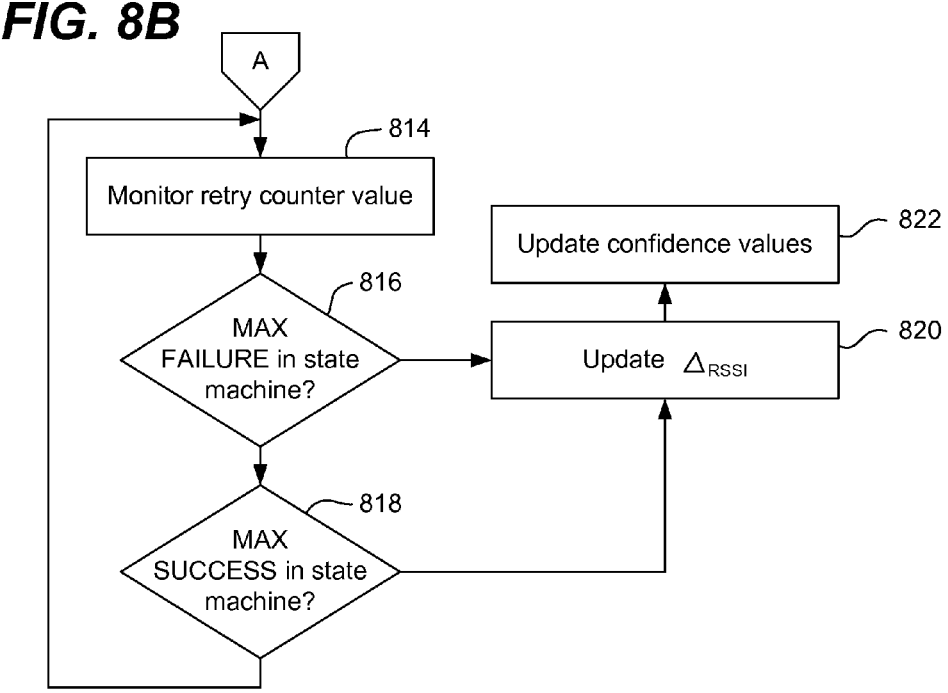

FIGS. 8A and 8B show a flowchart describing an exemplary rate adaptation algorithm. The rate adaptation module receives a measured RSSI value from the receive section (block 802) and determines $RSSI_{avg}$ using the filter 506 (block 804). The rate adaptation module receives the retry counter value from the transmit section (block 806) and determines a $\Delta_{RSSI}$ value (block 808). The rate adaptation generates confidence values corresponding to different data rates using the RSSIavg value, $\Delta_{RSSI}$ value, and $RSSI_{TH}$ values in a nominal RSSI table (block 810). The rate adaptation module may then select a data rate having the lowest positive confidence value (block 812). The rate adaptation module may continue to monitor the retry counter value (block 814). If the retry counter value causes the state machine (FIG. 7) to reach a maximum failure value (block 816) or a maximum success value (block 818), the rate adaptation module may update the $\Delta_{RSSI}$ value (block 820) and the confidence values (block 822).

Figure 9A:
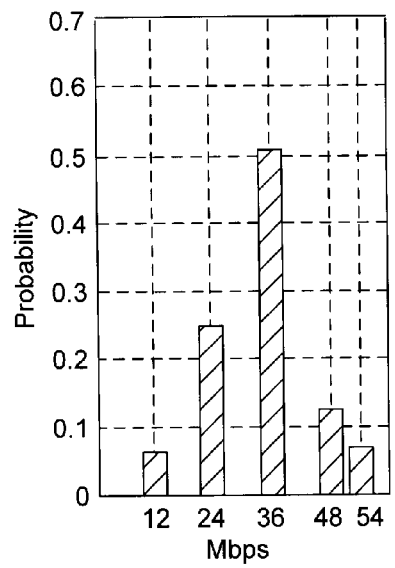
FIGS. 9A and 9B show results from two experiments using transceivers with a rate adaptation module.
Figure 9B:
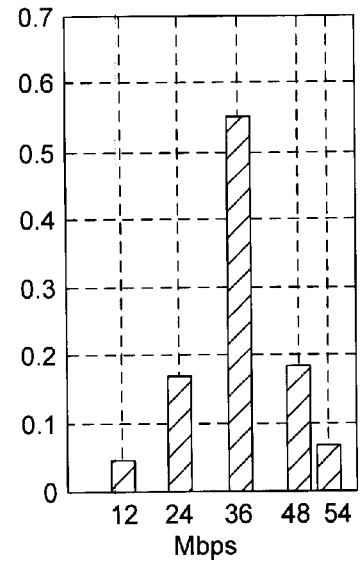

FIGS. 9A and 9B are plots showing the results of two experiments conducted to test the rate adaptation algorithm. Both tests used a transceiver in a cubicle, with a client receiver 45 feet away and transmissions on channel 11. The first test simulates an office environment, with a mean $\Delta_{RSSI}$ of 3.15 dB. In this scenario, the rate adaptation module selected a data rate of 36 Mbps over 50% of the time. In the second experiment, a bias of 6 dB was applied to simulate a different environment, with a resulting mean $\Delta_{RSSI}$ of 9.27 dB. In this scenario, the rate adaptation module also selected a data rate of 36 Mbps over 50% of the time.

In an embodiment, the rate adaptation module may include a switch 520 (FIG. 5), which may select the output of the retry processor 510 over the output of the rate selector 516 if the data rate falls below a minimum data rate, e.g., 6 Mbps, below which the RSSI measurement may not be accurate.

Figure 10:
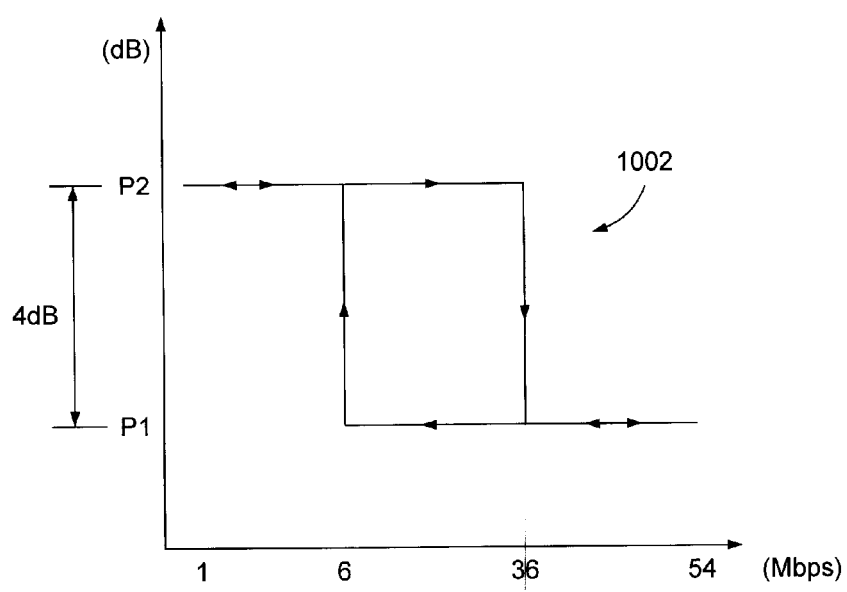
FIG. 10 is a plot illustrating a the response of a power adapter in the transceiver.

In an embodiment, the rate adaptation module may include a power adaptor 522. FIG. 10 is a graph showing the response of the power adaptor for different data rates. The power may be increased for lower data rates to account for presumed low link quality. The power may be reduced for high data rates for presumed good link quality. The response may include a hysteresis loop 1002 to prevent too frequent changes in power, e.g., due to the user walking away from an access point. The power adaptor 522 may be used to improve range for low data rates and reduce power amplifier non-linearity at high data rates.

A number of embodiments have been described. Nevertheless, it will be understood that various modifications may be made without departing from the spirit and scope of the invention. For example, blocks in the flowchart may be skipped or performed out of order and still produce desirable results. Accordingly, other embodiments are within the scope of the following claims.

The invention claimed is:

1. A method comprising:
   generating a transmission packet parameter associated with packets transmitted by a device at a first data rate that is selected from a plurality of data rates;
   generating a reception packet parameter associated with packets received by the device;
   generating confidence values for the plurality of data rates using information comprising the transmission packet parameter and the reception packet parameter;
   determining, from the plurality of data rates, a second data rate based on the transmission packet parameter and the reception packet parameter, wherein determining the second data rate is performed based on at least a portion of the confidence values; and
   transmitting future packets at the second data rate.

2. The method of claim 1, wherein generating the confidence values comprises:
   determining an average value associated with the reception packet parameter;
   determining a calibration value associated with the transmission packet parameter, the calibration value determined to refine the average value; and
   determining a confidence value based on the average value and the calibration value.

3. The method of claim 2, wherein determining the second data rate includes selecting as the second data rate a highest data rate associated with a lowest positive confidence value.

4. The method of claim 3, further comprising:
   monitoring a number of unsuccessful packets transmitted at the second data rate; and
   adjusting, based on the monitored number, the second data rate to a third data rate at which the future packets are to be transmitted, the third data rate being lower than the second data rate.

5. The method of claim 1, further comprising:
   identifying a nominal signal quality parameter from a nominal table containing a plurality of signal quality parameters including the reception packet parameter, each of the plurality of signal quality parameters having a different value and corresponding to a different data rate supported by a channel through which packets are transmitted or received,
   wherein determining the second data rate is performed based on the transmission packet parameter, the reception packet parameter, and the nominal signal quality parameter.

6. The method of claim 1, further comprising:
   identifying one or more packets that are transmitted at the second data rate unsuccessfully;
   determining a new data rate for each of the one or more identified packets that is to be retransmitted, the new data rate being different from the first data rate and the second data rate.

7. A device comprising:
   a first section configured to transmit packets at a first data rate and to generate a transmission packet parameter associated with the transmitted packets;
   a second section configured to receive packets and to generate a reception packet parameter associated with the received packets; and
   a rate selector to determine a second data rate from a plurality of data rates including the first data rate based on the transmission packet parameter and the reception packet parameter, the second data rate to be used by the first section for transmitting future packets, wherein the rate selector is configured to generate a confidence value for each of the plurality of data rates using information comprising the transmission packet parameter and the reception packet parameter.

8. The device of claim 7, wherein the rate selector is configured to:
   identify a nominal signal quality parameter from a nominal table containing a plurality of signal quality parameters including the reception packet parameter, each of the plurality of signal quality parameters having a different value and corresponding to a different data rate supported by a channel through which packets are transmitted or received; and
   determine the second data rate based on the transmission packet parameter, the reception packet parameter, and the nominal signal quality parameter.

9. The device of claim 7, wherein the rate selector is configured to:
   identify one or more packets that are transmitted at the second data rate unsuccessfully; and
   determine a new data rate for each of the one or more identified packets that is to be retransmitted, the new data rate being different from the first data rate and the second data rate.

10. The device of claim 9, wherein the rate selector is configured to reduce the new data rate if the one or more identified packets transmitted at the new data rate fail to be transmitted successfully.

11. The device of claim 9, wherein the rate selector is configured to determine the new data rate based at least in part on a number of times the one or more identified packets have been retransmitted.

12. The device of claim 9, wherein the rate selector is configured to:
   adjust the transmission packet parameter by a first predetermined value when a number of successive successful transmissions of the one or more packets at the second data rate exceeds a first predetermined threshold; and
   adjust the transmission packet parameter by a second predetermined value when a number of successive unsuccessful transmissions of the one or more packets at the second data rate exceeds a second predetermined threshold.

13. The device of claim 7, wherein:
   the transmission packet parameter includes a retry counter parameter; and
   the rate selector is configured to increment the retry counter parameter in response to a packet retransmission due to an unsuccessful transmission.

14. The device of claim 13, wherein the rate selector is configured to determine the second data rate based on the retry counter parameter.

15. The device of claim 7, wherein the rate selector is configured to determine an average value associated with the reception packet parameter, and a calibration value associated with the transmission packet parameter, the calibration value determined to refine the average value, and wherein at least one of the confidence values are based on the average value and the calibration value.

16. The device of claim 7, wherein the rate selector is configured to:
  select a highest data rate associated with a lowest positive confidence value as the second data rate.

17. The device of claim 16, further comprising a processor configured to:
  monitor a number of unsuccessful packets transmitted at the second data rate; and
  adjust, based on the monitored number, the second data rate to a third data rate at which the future packets are to be transmitted, the third data rate lower than the second data rate.

* * * * *